2,909,461

PROCESS FOR COMBATING TRICHURIS INFECTION OF DOMESTIC ANIMALS

Frank A. Ehrenford, Zionsville, Ind., assignor to Allied Laboratories, Inc., Kansas City, Mo., a corporation of Delaware No Drawing. Application December 22, 1958
Serial No. 781,937

3 Claims. (Cl. 167—53)

This invention relates to compositions useful in processes for combating Trichuris of infections of domestic animals.

More particularly the present invention relates to pharmaceutical compositions containing an effective quantity of an active ingredient comprising 3-methyl-1-pentyn-3-yl acid phthalate and/or salts thereof, and useful for combating Trichuris infection of domestic animals.

Parasitism by helminths constitutes a major source of disease and debility to domestic animals all over the world. One commonly occurring group of worms, Trichuris or whipworms, is quite host specific. Thus, these species of trichurids are found in the following hosts: in cattle, sheep and goats, *Trichuris ovis*; in swine, *Trichuris suis*; in dogs and foxes, *Trichuris vulpis*; and in rabbit, *Trichuris leporis*.

Whipworms most commonly inhabit the caecum of animals, and it is a difficult site to reach with orally administered anthelmintics because of the following recognized factors; gut dilution, distance, as effected by absorption, extra-digestive-tract location, and pH. Perhaps because of the location of the whipworms in the caecum, anthelmintics employed in the past have left a great deal to be desired. Orally administered drugs were the most convenient to use, but none of them employed in the past have been very effective. Treatment of dogs by using enemas was only partially effective, and quite impractical. In many dogs it was felt necessary to remove the caecum by expensive surgical procedures, which procedure did not prevent reinfection even in the absence of the caecum.

In accordance with the present procedure, it has been discovered that 3-methyl-1-pentyn-3-yl acid phthalate and/or its salts demonstrate a high degree of activity for Trichuris, when administered to infected domestic animals.

It is an important advantage of this invention that a class of pharmaceutical compositions possessing outstanding effectiveness against Trichuris infections of domestic animals are made available.

An outstanding advantage is the provision of a composition, useful in a process for combating or controlling Trichuris infections in canines.

In carrying out this invention, the new compounds 3-methyl-1-pentyn-3-yl acid phthalate and/or salts thereof are associated with suitable quantities of non-toxic pharmaceutical carriers to provide preparations having a definite dosage unit. The compositions may comprise dosage units in the form of tablets, powders, capsules, coated granules, and the like for oral administration. In other cases, the compositions may comprise 3-methyl-1-pentyn-3-yl acid phthalate and its salts in non-toxic liquid diluents suitable for oral administration. The liquid preparations may comprise solutions in water, glycerol, non-toxic glycols, alcohol, or combinations of water and the above solvents, and suspensions in such liquids.

The solid oral dosage forms are preferred since they are convenient to administer and 3-methyl-1-pentyn-3-yl acid phthalate and/or its salts are compatible with the ordinary solid diluents employed in tablets and/or capsules. The ordinary solid diluents include those such as talc, lactose, corn starch, stearic acid, magnesium stearate, methyl cellulose, vegetable gums and the like.

The new compounds 3-methyl-1-pentyn-3-yl acid phthalate and salts thereof employed as an active ingredient in my pharmaceutical compositions and process can be prepared as follows:

PREPARATION OF 3-METHYL-1-PENTYN-3-YL ACID PHTHALATE

A mixture of 500 gm. of 3-methyl-1-pentyn-3-yl, 755 gm. of phthalic anhydride, and 404 gm. of pyridine are stirred for six hours at a temperature of 115–120° C. it is then cooled, mixed with 3200 ml. of water, acidified with hydrochloric acid, and chilled in an ice-bath until crystallization is complete. The crystals are redissolved in water with the aid of a slight excess of sodium carbonate. This solution is stirred with decolorizing carbon, filtered, and acidified with hydrochloric acid. The crystals thus obtained are the acid phthalate of 3-methyl-1-pentyn-3-yl. Further purification by recrystallization from dilute alcohol gives white crystals which melt at 99–101° C.

PREPARATION OF 3-METHYL-1-PENTYN-3-YL SODIUM PHTHALATE

Four hundred and fifty grams of 3-methyl-1-pentyn-3-yl acid phthalate, as prepared above, are dissolved in 450 ml. of distilled water with the aid of 96.5 gm. of sodium carbonate. The resulting solution is concentrated to a thick syrup by evaporation under reduced pressure at temperatures not over 40° C., and the syrup is stirred into 5 liters of acetone, then chilled in an ice-bath. The white powder which precipitates is collected by filtration and air dried. It is the desired 3-methyl-1-pentyn-3-yl sodium phthalate, having the formula:

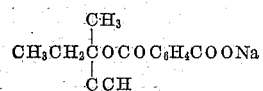

In the foregoing example, the sodium carbonate may be replaced by other suitable bases to produce other salts, included within the scope of my invention. Among those basic substances which can be employed are potassium carbonate, calcium carbonate, ammonium hydroxide, monoethanolamine, diethanol amine, ethylene diamine, and the like.

Representative dosage unit forms produced in accordance with my invention, are illustrated by the following specific examples:

Example I.—*Tablets (0.25 gram)*

Two hundred fifty grams of 3-methyl-1-pentyn-3-yl acid phthalate are mixed with an aqueous mucilage containing 10 grams of starch and 10 grams of acacia, the moist mass is rubbed through a sieve and the resulting granules dried. The dried, granulated material is mixed with 25 grams of starch, 25 grams of talc and 5 grams of magnesium stearate; then compressed into tablets. This makes 1,000 tablets, each containing 0.25 gram of 3-methyl-1-pentyn-3-yl acid phthlate.

Example II.—*Tablets (0.5 gram)*

Five hundred grams of 3-methyl-1-pentyn-3-yl sodium phthalate are mixed with an aqueous mucilage containing 20 grams of starch and 20 grams acacia, the moist mass is rubbed through a sieve and the resulting granules dried. The dried granules are mixed with 50 grams of starch, 30 grams of talc, and 5 grams of magnesium stearate, and compressed into tablets. This makes 1,000 tablets, each containing 0.5 gram of 3-methyl-1-pentyn-3-yl sodium phthalate.

Example III.—Coated tablets (1.0 grams)

One thousand grams of 3-methyl-1-pentyn-3-yl acid phthalate are mixed with an aqueous mucilage containing 40 grams of starch and 40 grams of acacia, the moist mass is rubbed through a sieve and the resulting granules dried. The dried granules are mixed with 100 grams of starch, 100 grams of talc, and 20 grams of magnesium stearate, and compressed into tablets. This makes 1,000 tablets, each containing 1.0 grams of 3-methyl-1-pentyn-3-yl acid phthalate.

The tablets are sugar coated by treatment with a sugar syrup in a rotating coating drum to produce a primary coat; they are next coated with a powder comprising a mixture of starch, talc, and sugar; then the final sugar syrup coat containing a flavor is applied.

Example IV.—Capsules (1 gram)

One thousand grams of 3-methyl-1-pentyn-3-yl acid phthalate are reduced to a fine powder and hand filled into hard gelatin capsules to produce 1,000 capsules, each containing 1 gram of the active ingredient.

Example V.—Capsules (0.5 gram)

Five hundred grams of 3-methyl-1-pentyn-3-yl sodium phthalate are mixed with 200 grams of starch and machine filled into hard gelatin capsules to produce 1,000 capsules, each containing 0.5 gram of active ingredient.

Example VI.—Coated granules

Two hundred fifty grams of 3-methyl-1-pentyn-3-yl acid phthalate of 20 to 30 mesh particle size are placed in a coating pan and coated by the addition of suitable portions of 10 grams of white wax in 150 cc. of naphtha, and the excess solvent evaporated. Next, two light sugar coats are applied by the addition of suitable portions of a solution of 100 grams of sucrose in 50 cc. of water. The last portions of this syrup applied have added to it 0.1 gram of a yellow color tartrazine, 1.6 grams of citric acid and 2 cc. of a lemon flavor concentrate. Lastly, there is applied in suitable portions a final coat of 0.25 gram of white wax, 0.25 gram of carnauba wax in 20 cc. of naphtha and the excess solvent removed by evaporation. There is obtained 350 grams of a coated, flavored, granular material containing 70% of the active ingredient.

Example VII.—Aqueous suspensions

One hundred grams of 3-methyl-1-pentyn-3-yl acid phthalate are reduced to fine powder by trituration, and suspended in 1,000 cc. of an aqueous 25% sugar syrup containing an orange flavor and 1% high viscosity methyl cellulose. Each 5 cc. quantity of the final suspension contains 0.5 gram of the active ingredient.

Example VIII.—Aqueous suspensions

Two hundred grams of 3-methyl-1-pentyn-3-yl acid phthalate which has been reduced to a fine powder are suspended in 1,000 cc. of a cherry flavored aqueous mucilage, containing 1% tragacanth. Each 5 cc. of the final suspension contains 1 gram of the active ingredient.

Example IX.—Aqueous solutions

Five hundred grams of 3-methyl-1-pentyn-3-yl sodium phthalate are dissolved in 1,000 cc. of an aqueous 25% sucrose solution, containing 2% of an artificial orange flavor. Each cc. of the final solution contains 0.5 gram of active ingredient.

Example X.—Aqueous-alcoholic solutions

Two hundred grams of 3-methyl-1-pentyn-3-yl sodium phthalate are dissolved in 1,000 cc. of a liquid diluent comprising glycerin 10%; alcohol 20%; sucrose 20%; artificial orange flavor 5 cc.; saccharine 1 grain; and the remainder water. Each 5 cc. of the final solution contains 0.5 gram of the active ingredient.

It is seen from the foregoing examples that the quantity in my compositions may be varied. It would only be necessary that the effective ingredient be present in a convenient unit quantity, to provide a suitable dose. The percent of the active ingredient should not in general be less than 0.5%. In some cases, however, the active ingredient may comprise essentially 100%. For example:

(1) Hard gelatin capsules, containing the active ingredient without a diluent.

It is readily understood, therefore, that in preparing the dosage unit forms the active ingredients may constitute a major proportion, or a minor proportion of the composition, so long as the dosage unit form is a size that is convenient to administer in order to provide an effective quantity of the active ingredient.

The process of using my compositions for combating and/or controlling Trichuris infection of domestic animals will be illustrated by the following specific examples, using dogs as the representative animal.

DOG EXPERIMENTS

Test dogs with appropriate parasite burdens were determined qualitatively by fecal flotation using sodium dichromate solution of specific gravity 1.36. Anthelmintic efficacy was determined by autopsy, and actual count of any remaining parasites. In those dogs that are not fasted, and/or fed shortly before dosing, two (2) doses of 200 mg./kg. (90 mg. per pound) a.m. and p.m. is highly effective. In dogs that have been fasted, or fed only milk twenty-four (24) hours before dosing, a single dose of 250 mg./kg. (115 mg. per pound) is highly effective. The following Table I summarizes the results obtained in a study such as that just described.

TABLE I.—WHIPWORM TREATMENT OF DOGS WITH 3-METHYL-1-PENTYN-3-YL ACID PHTHALATE

| No. Dogs Treated | Fasted | Dosage [1] | Efficacy Based On Autopsy |
|---|---|---|---|
| 3 | Yes | 100 mg./kg. a.m. and p.m. | 2 of 3 freed. |
| 6 | Yes | 225 mg./kg. | 3 of 6 freed. |
| 20 | Yes | 250 mg./kg. | 15 of 20 freed. |
| 4 | No | 100 mg./kg. a.m. and p.m. following meal. | 0 of 4 freed. |
| 2 | No | 125 mg./kg. a.m. and p.m. following meal. | 1 of 2 freed. |
| 3 | No | 150 mg./kg. a.m. and p.m. following meat meal. | 1 of 3 freed. |
| 6 | No | 175 mg./kg. a.m. and p.m. following meat meal. | 5 of 6 freed. |
| 1 | No | 194 mg./kg. a.m. and p.m. | 0 of 1 freed. |
| 20 | No | 200 mg./kg. a.m. and p.m. following meal. | 17 of 20 freed. |

[1] 0.5 gm. tablets.

In the following experiment 3-methyl-1-pentyn-3-yl acid phthalate, demonstrated high level efficacy against Trichuris vulpis in single dose treatments in dogs fed only milk the day before dosing. Fecal flotation and autopsy data both disclosed that the worms were removed slowly, so that in 3–6 days all or most of the caecal worm population was absent.

Data obtained on 17 dogs are as follows:

| No. of Dogs | Dose,[1] mg./kg. | No. days dose to Autopsy | Autopsy Data |
|---|---|---|---|
| 3 | 100 | 6 | Trichuris not removed. |
| 4 | 200 | 3 | Trichuris and Uncinaria removed in 3; Trichuris not removed in 1. |
| 3 | 200 | 5 and 14 | Trichuris and Uncinaria removed in 2; Trichuris removed in 1. |
| 2 | 250 | 6 | Trichuris removed. |
| 1 | 300 | 7 | Do. |
| 4 | 500 | 5 and 6 | Do. |

[1] All doses administered in hard gelatin capsules as prepared in Example IV.

In further studies, information was obtained concerning the effective dose, and toxicity data for 3-methyl-1-pentyn-3-yl acid phthalate. These data, based on the presence or absence of Trichuris at autopsy, show a clearance dose in the range of about 120 mg./kg. (97 mg./kg. to 149 mg./kg.). Signs of toxicity, ataxia, hypnosis, emesis, and anorexia, appeared in 50 percent of the animals at 450 and 475 mg./kg. Some evidence was obtained at lower doses which indicated a delay in passage of Trichuris from the caecum. On a dose of 125 mg./kg., 1 of 6 dogs was cleared in 2 days, while in 5 days at the same dose, 4 of 6 dogs were cleared. One dog dosed with 250 mg./kg., had a positive fecal for Trichuris 6 days post dose, but at autopsy on the 6th day was apparently negative for adult Trichuris. These observations are interpreted to indicate that caecal-emptying time probably exerts some delaying influence in clearing adult worms in treated dogs.

The term "dosage unit form" employed in the present specification and claims is understood to mean a pharmaceutical preparation suitable for administration in convenient quantity to a patient, to provide a predetermined dose of the active ingredients. Solid dosage unit forms include tablets, capsules, powders, coated particles, soft pills and the like. Liquid dosage unit forms include solutions, tinctures, elixirs, emulsions, suspensions and the like.

A rather wide range of dosage units can be employed, since doses of the active ingredients of the compositions of the present invention ranges from about 30 mg./kg. to 1,000 mg./kg., depending upon the species, whether more than one dose is employed, and whether the patient has been fasted.

For example, a small type dog weighing 2.2 pounds (1 kilo) could be conveniently dosed with a capsule, or tablet, containing 100 mg. of the active ingredient, or with a liquid preparation containing 100 mg. of the active ingredient per each teaspoonful (5 cc.).

In cases where desired, my compositions, in addition to containing the specific active ingredient disclosed herein, may also include other auxiliary substances. These include other substances having an anthelmintic action, especially those recognized in the art as being effective against helminths that frequently are found infecting domestic animals also infected with Trichuris.

Because oral doses showed evidence of absorption by reason of central nervous system signs of ataxia and nausea, parenteral administration was indicated.

Aqueous solutions may be prepared by using the readily soluble sodium salt of 3-methyl-1-pentyn-3-yl. For example, a 50 percent solution was prepared by adding 5.0 grams of the sodium salt of 3-methyl-1-pentyn-3-yl to 5.0 cubic centimeters of distilled water, which combination results in approximately 5 cubic centimeters of a 50 percent solution.

Parenteral administration of 20 percent and 50 percent solutions were given by the intravenous route through the cephalic vein. The therapeutic results obtained using a 50 percent solution are shown in Table III.

TABLE III.—RESULTS OF INTRAVENOUS ADMINISTRATION OF A 50 PERCENT WATER SOLUTION OF SODIUM SALT OF 3-METHYL-1-PENTYN-3-YL ON CANINE TRICHURIASIS

| No. of Dogs | Fasted | Dose cc. | Dose mg./kg. | Efficacy Based on Necropsy Examination | Percent Efficacy |
|---|---|---|---|---|---|
| 6 | yes; milk only day prior to dose. | 2.8 / 1.8 / 3.0 / 2.6 / 2.8 / 5.9 | 150 / 150 / 150 / 150 / 150 / 150 | None Freed | 0 |
| 6 | yes | 3.2 / 3.2 / 3.8 / 4.4 / 2.4 / 2.6 | 175 / 175 / 175 / 175 / 175 / 175 | 2 Freed | 33 |
| 6 | yes | 3.5 / 3.5 / 4.0 / 4.5 / 3.8 / 2.7 | 200 / 200 / 200 / 200 / 200 / 200 | 3 Freed | 50 |
| 6 | yes | 6.0 / 6.0 / 6.0 / 5.0 / 4.6 / 5.4 | 300 / 300 / 300 / 300 / 300 / 300 | 5 Freed | 83 |

Additionally, a second parenteral route was used, administration intraperitoneally in the inguinal region. The results obtained by using a 50 percent solution are shown in Table IV.

TABLE IV.—RESULTS OF INTRAPERITONEAL ADMINISTRATION OF A 50 PERCENT AQUEOUS SOLUTION OF SODIUM SALT OF 3-METHYL-1-PENTYN-3-YL ON CANINE TRICHURIASIS

| No. of Dogs | Dose, mg./kg. | Efficacy Based on Necropsy | Percent Efficacy |
|---|---|---|---|
| 5 | 200 | 2 freed | 40 |
| 9 | 300 | 5 freed | 56 |
| 6 | 400 | 5 freed | 83 |
| 6 | 450 | 6 freed | 100 |

This application is a continuation-in-part of my co-pending application, Serial No. 393,231, filed November 19, 1953, now abandoned.

I claim:

1. A process for combating Trichuris infections of domestic animals which comprises administration of an effective quantity of a substance from the group consisting of 3-methyl-1-pentyn-3-yl acid phthalate and non-toxic salts thereof to a Trichuris infected domestic animal.

2. A process for combating Trichuris infections of dogs which comprises administration of an effective quantity of 3-methyl-1-pentyn-3-yl acid phthalate to be Trichuris infected dog.

3. A process for combating Trichuris infections of dogs which comprises administration of an effective quantity of 3-methyl-1-pentyn-3-yl sodium phthalate to a Trichuris infected dog.

References Cited in the file of this patent

FOREIGN PATENTS 505,421  Belgium _____ Sept. 15, 1951

OTHER REFERENCES

Margolin: Science, vol. 114, October 12, 1951, pp. 384, 385.

Papa: Archives of Biochem. and Biophysics, vol. 33, October 1951, pp. 482, 483.